(12) United States Patent
Kim et al.

(10) Patent No.: US 7,575,813 B2
(45) Date of Patent: Aug. 18, 2009

(54) WOOD FLOORING WITH LAMINATED WOOD AND PLASTIC LAYERS USING SYMMETRIC STRUCTURE AND METHOD OF MANUFACTURING THE SAME

(75) Inventors: Young-Gi Kim, Cheongju-si (KR); Kie-Sun Han, Cheongju-si (KR); Seong-Chan Park, Cheongju-si (KR)

(73) Assignee: LG Chem, Ltd. (KR)

( * ) Notice: Subject to any disclaimer, the term of this patent is extended or adjusted under 35 U.S.C. 154(b) by 722 days.

(21) Appl. No.: 10/509,953

(22) PCT Filed: Mar. 24, 2003

(86) PCT No.: PCT/KR03/00574

§ 371 (c)(1),
(2), (4) Date: May 6, 2005

(87) PCT Pub. No.: WO03/084746

PCT Pub. Date: Oct. 16, 2003

(65) Prior Publication Data

US 2005/0227104 A1     Oct. 13, 2005

(30) Foreign Application Priority Data

Apr. 4, 2002    (KR) ................ 10-2002-0018410

(51) Int. Cl.
*B32B 29/00*    (2006.01)
(52) U.S. Cl. ............... 428/528; 428/535; 428/537.1; 427/384; 427/393; 427/408; 427/412.1

(58) Field of Classification Search ............ 428/528, 428/535, 537.1; 427/384, 393, 412.1, 408
See application file for complete search history.

(56) References Cited

U.S. PATENT DOCUMENTS

| 6,617,009 | B1 * | 9/2003 | Chen et al. | 428/195.1 |
| 6,986,934 | B2 * | 1/2006 | Chen et al. | 428/195.1 |
| 7,169,460 | B1 * | 1/2007 | Chen et al. | 428/195.1 |

FOREIGN PATENT DOCUMENTS

| KR | 1998-047176 | | 9/1998 |
| KR | 2000-0060158 | | 10/2000 |
| KR | 000060158 A | * | 10/2000 |
| KR | 10-0297401 | | 5/2001 |

* cited by examiner

*Primary Examiner*—Leszek Kiliman
(74) *Attorney, Agent, or Firm*—Cantor Colburn LLP

(57) ABSTRACT

It is provided a wood flooring having laminated wood and plastic layers symmetric to each other and method of manufacturing the same. The wood flooring has an upper layer including laminated wood, a core layer including plastic sheets manufactured by calendaring, and a lower layer including veneer board, the lower layer being made of the same material as the upper layer, which are piled up symmetrically in order to keep the balance between the upper layer and lower layer, and then integrated under a constant temperature and pressure to form a suitable layers made by wood and plastic, thereby providing natural feeling in surface and solving the problem of distortion according to the change of environment.

20 Claims, 4 Drawing Sheets

WOOD FLOORING WITH LAMINATED WOOD AND PLASTIC LAYERS USING SYMMETRIC STRUCTURE AND METHOD OF MANUFACTURING THE SAME

TECHNICAL FIELD

The present invention relates to a wood flooring having laminated wood and/plastic layers symmetric to each other and method of manufacturing the same. More specifically, the present invention provides a wood flooring including an upper layer having laminated wood, a core layer having plastic sheets manufactured by calendaring, and a lower layer having veneer board, the lower layer being made of the same material as the upper layer, in which the lower, core and upper layers being piled up symmetrically in order to keep the balance between the upper layer and the lower layer, and then integrated under a constant temperature and pressure to form suitable layers made by wood and plastic, thereby providing natural feeling in surface and solving the problem of distortion according to the change of environment.

BACKGROUND ART

FIG. 1 is a schematic cross-sectional view of a conventional natural wood flooring. From the bottom, a plywood layer (60) constituted by five veneer boards, a laminated wood layer (20), and a surface painting layer (10) are shown in the wood flooring.

The conventional natural wood flooring is manufactured by piling simply a laminated wood on a plywood and painting the surface to finish, which has a good point of natural feeling due to the laminated wood. In this wood flooring, however, the moisture from a ground has transmitted to the plywood, which is apt to be moldy. Further, when this wood flooring is used in the Korean under-floor heating system, its low heat conduction results in much heat loss before it gets warm. The wood flooring also has low soundproof effect since it is made of wood of low density. Moreover, the wood flooring consists of wood as a whole, which makes the shape changed severely due to moisture, thereby resulting in distortion caused by high contraction and expansion.

FIG. 2 is a schematic cross-sectional view of a natural wood flooring PVC tile which is disclosed in Korean Patent Laid-open Publication No. 1998-47176. The PVC tile is manufactured by piling a PVC sheet (70) on a laminated wood (20), combining them into one body by hot press at 180° C., and then attaching a back sheet (80) as a lower layer. In this case, however, in order to combine a laminated wood with a plastic layer (which has different properties from the laminated wood) into one body with minimized deformation of the plastic layer, it is required to press them under sequential hot and cold condition. Under the temperature of 180° C., the plastic layer expands excessively and deforms severely until it gets to the room temperature after released from the press. Therefore, it is difficult for the PVC tile manufactured as such to be used as a finished product.

FIG. 3 is a schematic cross-sectional view of a wood flooring with laminated wood which is disclosed in Korean Patent Registration No. 292,585. The wood flooring has a lower layer reinforced by glass fiber and is more settled than the PVC tile of Korean Patent Laid-open Publication No. 1998-47176. Nonetheless, the wood flooring does not have sufficient balancing effect due to its asymmetric structure in the upper and lower sides.

DISCLOSURE OF THE INVENTION

Accordingly, the present invention provides a wood flooring which includes an upper layer having laminated wood for giving natural feeling, a core layer having plastic for minimizing the deformation due to moisture and heat, improving the dimension stability greatly compared to conventional wood floorings when used in the Korean under-floor heating system, and blocking the moisture from a ground to minimize its adverse effect, and a lower layer having the same material as the upper layer for preventing the distortion due to heat and moisture, thereby giving the stability due to the symmetric structure and being suitable to the Korean under-floor heating system.

The present invention provides a wood flooring which includes elvan, jade, loess, etc. in a plastic layer to increase the radiation of far infrared ray, thereby being good for the health.

The present invention provides a wood flooring which has a soundproof sheet layer manufactured separately or has soundproof materials in a plastic layer for increasing the soundproof effect and decreasing the ground crashing sound.

The present invention provides a method of manufacturing a wood flooring which ensures the structural stability by pressing under a constant pressure with heating and cooling sequently in the condition of a temperature ranging from 110 to 150° C. and releasing the pressure to maintain the temperature of product below room temperature, and maintains the balance of symmetric structure by using for the lower layer not a plastic sheet but the same material as the upper layer.

The present invention relates to a wood flooring having laminated wood and plastic layers symmetric to each other. The wood flooring comprises an upper layer including a laminated wood, a core layer including plastic sheets manufactured by calendaring, and a lower layer including veneer boards, the lower layer being made of the same material as the upper layer, in which the upper, core and lower layers are pressed into an integrated body under a constant temperature and pressure, and a method of manufacturing the same.

In accordance with one aspect of the present invention, it is provided a wood flooring comprising, a lower layer including a first veneer layer and a first adhesive layer on the first veneer layer, a core layer including a first plastic layer on the first adhesive layer and a second adhesive layer on the first plastic layer, and an upper layer including a laminated wood layer on the second adhesive layer, wherein the upper layer and the lower layer are symmetric with respect to the core layer.

In accordance with another aspect of the present invention, the core layer further includes a second veneer layer on the second adhesive layer, a third adhesive layer on the second veneer layer, a second plastic layer on the third adhesive layer, and a fourth adhesive layer on the second plastic layer.

According to the present invention, wood material is used for both the veneer layer of the lower layer and the laminated wood layer of the upper layer, in the same manner for maximizing the balancing effect of the symmetric structure.

A laminated wood layer generally shows the appearance of natural wood material and is obtained from suitable species of tree in compliance with one's taste, such as cherry, maple, oak, birch, etc. Each tree has a different texture and pattern of wood from the others' and may be classified into straight-grain wood and cross-grain wood according to the texture of wood.

For instance, the veneer board of the first veneer layer may be obtained from such wood as used in the manufacture of plywood, in the interior of furniture, in a railroad tie, or in a building, which has higher density, strength and dimension stability than that used in the upper layer. Examples of such trees are the species of keruing, kapur and mersawa, which grow naturally in Southeast Asia.

A painting layer is preferably coated on the laminated wood layer, and it includes a top, middle and bottom painting layers.

The laminated wood layer may include a laminated wood sliced from material wood, HPL (high pressure laminate) or LPM (low pressure melamine). The HPL and LPM include wood pattern.

In the wood flooring of the present invention, the first or second plastic layer includes at least one selected from the group consisting of polyethylene (PE), polypropylene (PP), polyvinyl chloride (PVC), rubber and polyurethane (PU), as a base polymer. Preferable base polymer is polyvinyl chloride.

The wood flooring of the present invention may further include calcium carbonate in the first or second plastic layer for increasing the effect of under-floor heating system. The calcium carbonate is preferably added in an amount of at least 70% by weight of the total weight of the first or second plastic layer.

Further, the wood flooring of the present invention may further include at least one selected from the group consisting of elvan, jade and loess for promoting health. Preferably, the elvan, jade or loss may be added in an amount of 10 to 20% by weight of the total weight of the calcium carbonate, in order to increase radiation of far infrared ray without affecting the physical property of wood flooring.

In the wood flooring of the present invention, a soundproof layer may be further contained or iron may be added to the plastic layer for enhancing the soundproof effect. For sufficient soundproof effect, the iron is preferably added in an amount of at least 100 parts by weight per 100 parts by weight of the base polymer. In this case, the amount of calcium carbonate is reduced to be 150 to 200 parts by weight per 100 parts by weight of the base polymer.

The method of manufacturing the wood flooring, according to one embodiment of the present invention, comprises making a lower layer including a first veneer layer and coating an adhesive on the first veneer layer; making a core layer including a first plastic layer and coating the adhesive on the first plastic layer; sequentially piling up the lower layer, the core layer, and an upper layer including a laminated wood layer and pressing the piled layers into an integrated body; and making a surface painting layer on the laminated wood layer of the integrated body and cutting the integrated body on which the surface painting layer is made.

According to another embodiment of the present invention, making the core layer further comprises: making a second veneer layer and a second plastic layer; and coating the adhesive on the second veneer layer and the second plastic layer, wherein the the second veneer layer and the second plastic layer are sequentially piled on the first plastic layer.

According to another embodiment of the present invention, making the core layer further includes pressing and integrating the piled first plastic layer, second veneer layer and second plastic layer.

In exemplary embodiments of the invention, pressing the piled layer into an integrated body includes pressing the laminated wood and the first and second plastic layers, which have different properties from the laminated wood, under a constant pressure with sequent heating and cooling, into the integrated body so as to minimize the deformation of the first and second plastic layers. Preferably, the heating temperature of pressing is 110 to 150° C., since higher temperature results in excessive swelling of the plastic layers and also causes serious deformation until the product is cool to a room temperature after the release of pressure. Further, it is preferred to pile up the lower veneer layer having the same texture, thickness and pattern direction as the upper laminated wood layer.

BRIEF DESCRIPTION OF THE DRAWINGS

The above and other objects, features and other advantages of the present invention will be more clearly understood from the following detailed description taken in conjunction with the accompanying drawings, in which.

EXPLANATION OF REFERENCE NUMBERS IN DRAWINGS

Figure 1:
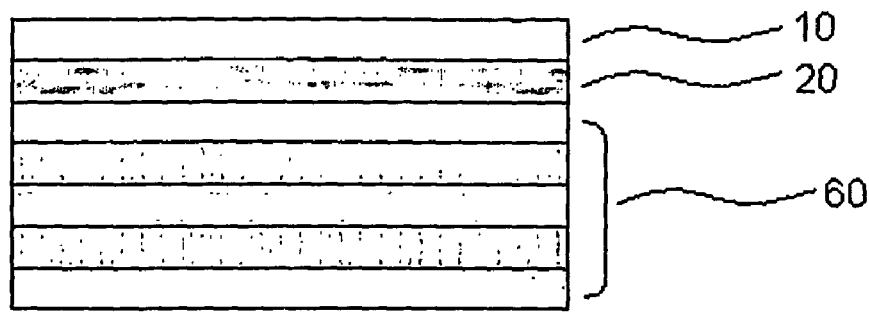
FIG. 1 is a schematic cross-sectional view of a conventional natural wood flooring.

10: surface painting layer
20: laminated wood layer
30: adhesive layer
40: plastic layer
50: veneer layer
60: plywood layer
70: PVC layer
80: back sheet layer

BEST MODE FOR CARRYING OUT THE INVENTION

Figure 4:
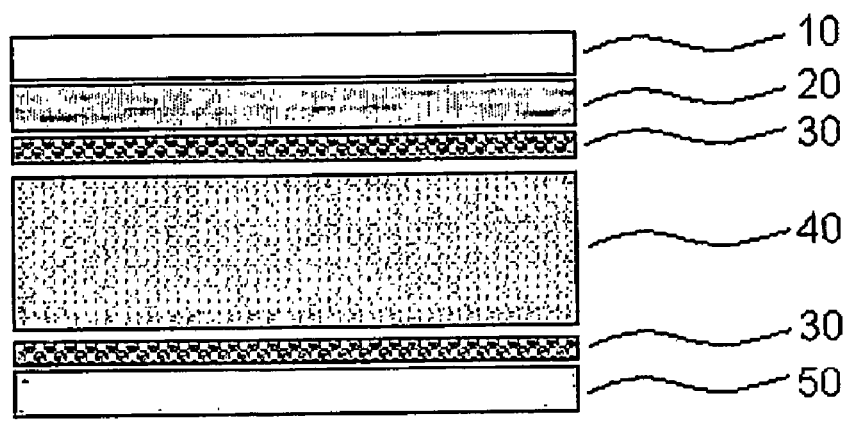
FIG. 4 is a schematic cross-sectional view of a wood flooring with a symmetric structure according to an embodiment of the present invention.

FIG. 4 is a schematic cross-sectional view of a wood flooring with a symmetric structure according to an embodiment of the present invention. The wood flooring comprises a surface painting layer (10), a laminated wood layer (20), an adhesive layer (30), a plastic layer (40), an adhesive layer (30) and a veneer layer (50), from the top. In the wood flooring, the laminated wood layer (20) and the veneer layer (50), which have the same thickness, material, and pattern direction, make a symmetric structure with respect to the plastic layer (40) in the middle.

Figure 5:
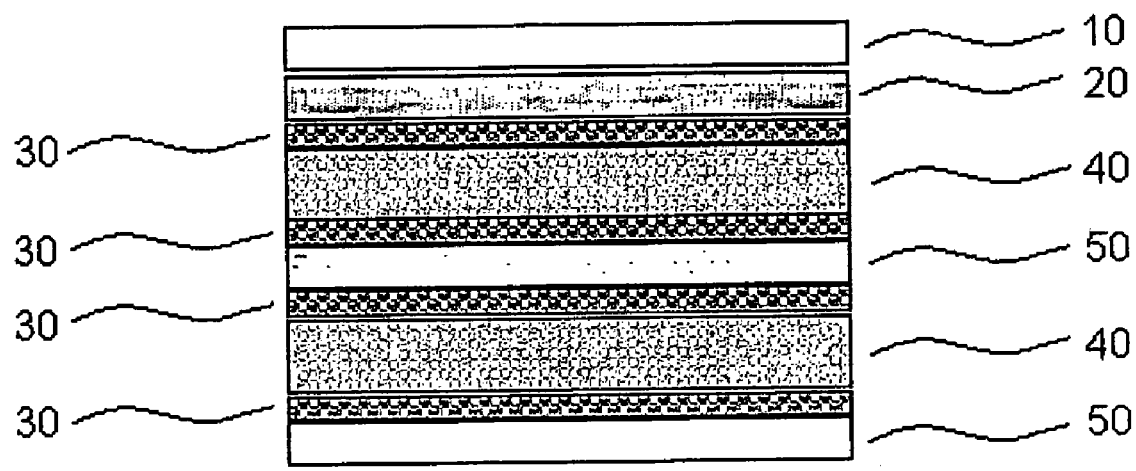
FIG. 5 is a schematic cross-sectional view of a wood flooring with a symmetric structure according to another embodiment of the present invention.

FIG. 5 is a schematic cross-sectional view of a wood flooring with a symmetric structure according to another embodiment of the present invention. The wood flooring comprises a surface painting layer (10), a laminated wood layer (20), an adhesive layer (30), a plastic layer (40), an adhesive layer (30), a veneer layer (50), an adhesive layer (30), a plastic layer (40), an adhesive layer (30) and a veneer layer (50), from the top. The wood flooring makes the symmetric structure with respect to with the veneer layer (50) in the middle.

Figure 6A:
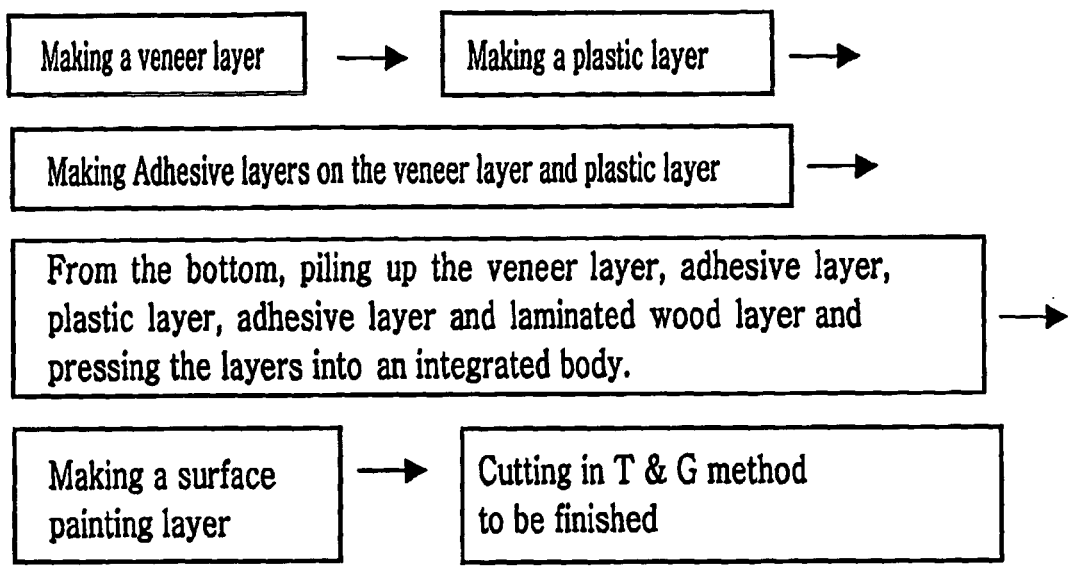
FIGS. 6a and 6b are schemes for illustrating the manufacturing process of a wood flooring with a symmetric structure according to the present invention.

FIG. 6a is a scheme for illustrating the manufacturing process of a wood flooring with a symmetric structure according to the present invention.

With reference to FIGS. 4 and 6a, a plastic layer (40) and a veneer layer (50) are prepared. The plastic layer (40) and veneer layer (50) constitute the core and lower layers of the wood flooring, respectively. A laminated wood layer (20) is made of sliced material wood with elegant appearance, and constitutes the upper layer of the wood flooring.

The veneer layer (50) is made of any veneer used for conventional wood floorings, which is typically obtained from a broad-leaved tree from the tropics (from the South Seas). A veneer made of material wood, which is lumbered and sliced with a constant thickness, and then dried until the water content is 12% or less, is used for the wood flooring of the present invention. A veneer with a thickness of 0.2 to 3.0 mm may be laid under the plastic layer (40) with the same direction as the upper layer, i.e., the laminated wood layer (20) for adjusting the balance and variation and stabilizing the design of the wood flooring of the present invention. Further, with the lower layer (which is composed with the same material as the upper layer and piled in the same direction), the entire balance and stability of wood flooring are enhanced.

According to another embodiment, a plurality of veneer boards may be used to manufacture a plywood and then a laminated wood is piled on the plywood. Specifically, with reference to FIG. 5, a core layer is comprised of two plastic layers, and a veneer layer (50) is held between the two plastic layers to manufacture a plywood having three veneer boards, on which a laminated wood layer (20) is piled up and under which another veneer layer (50) (or another laminated wood layer may be laid), thereby enhancing the stability. In this case, the plastic layer (40), the veneer layer (50) and the other plastic layer (40) may be integrated into one body to make a primary half-finished product, on which the upper and lower layers may be piled.

With reference to FIG. 4 again, the plastic layer (40), which is the core layer of the wood flooring, may be made of PE (polyethylene), PP (polypropylene), PVC (polyvinyl chloride), rubber, PU (polyurethane), etc. The following is provided as an example of manufacturing process of the plastic layer (40) using PVC. Based on PVC resin with a degree of polymerization of 900 to 1,300, 30 to 36 parts by weights of dioctyl phthalate (plasticizer), 400 to 600 parts by weight of calcium carbonate (inorganic filler) with the specific gravity of 2.5 to 2.8, and 5 to 10 parts by weight of barium stearate (stabilizer) are added to 100 parts by weights of PVC. The mixture is milled sufficiently by a roller at a temperature ranging from 160 to 190° C., rolled by calendar to a thickness of 2.0 to 3.0 mm, and then cut in a size of 920 to 1,000 mm by 920 to 1,000 mm. The manufactured PVC sheet is piled between the laminated layer (20) and the veneer layer (50).

Calcium carbonate is added to the PVC layer (40) in an amount of at least 70% of the total weight of the PVC layer (40) to enhance the effect of under-floor heating system. Elvan, jade or loess is preferably added in an amount of 10 to 20% of the total weight of the calcium carbonate for promoting health. Further, an additional sheet for soundproof effect may be piled up, or Fe may be added to the PVC layer (40) for enhancing the soundproof effect of wood flooring.

Adhesive layers (30) are made on each of the veneer layer (50), plastic layer (40) and laminated wood layer (20). The adhesive used in the layers (30) is preferably an epoxy adhesive manufactured by reacting epichlorohydrin with bisphenol A to produce an ordinary epoxy resin, which is then mixed with hardeners such as aliphatic amine, polyamide or polysulfydro. 1 part by weight of epoxy resin is mixed with 1 part by weight of hardener and the mixture is coated on each of the layers in an amount of 70 to 150 g/m$^2$. The adhesive layers (30) may be used after being coated on glass fiber (30 to 100 g/m$^2$) rather than used alone for reinforcing the dimension stability.

After the adhesive was coated between the laminated layer (20) and plastic layer (40), and between the plastic layer (40) and veneer layer (50), the layers are piled up in the order of the laminated layer (20), plastic layer (40) and veneer layer (50), and then heat-pressed at a temperature of 120±3° C. under a pressure of 10±2 kg/cm$^2$ for 10 to 30 minutes and cooled subsequently until the temperature of surface reaches 35° C. to make an integrated body.

Figure 6B:
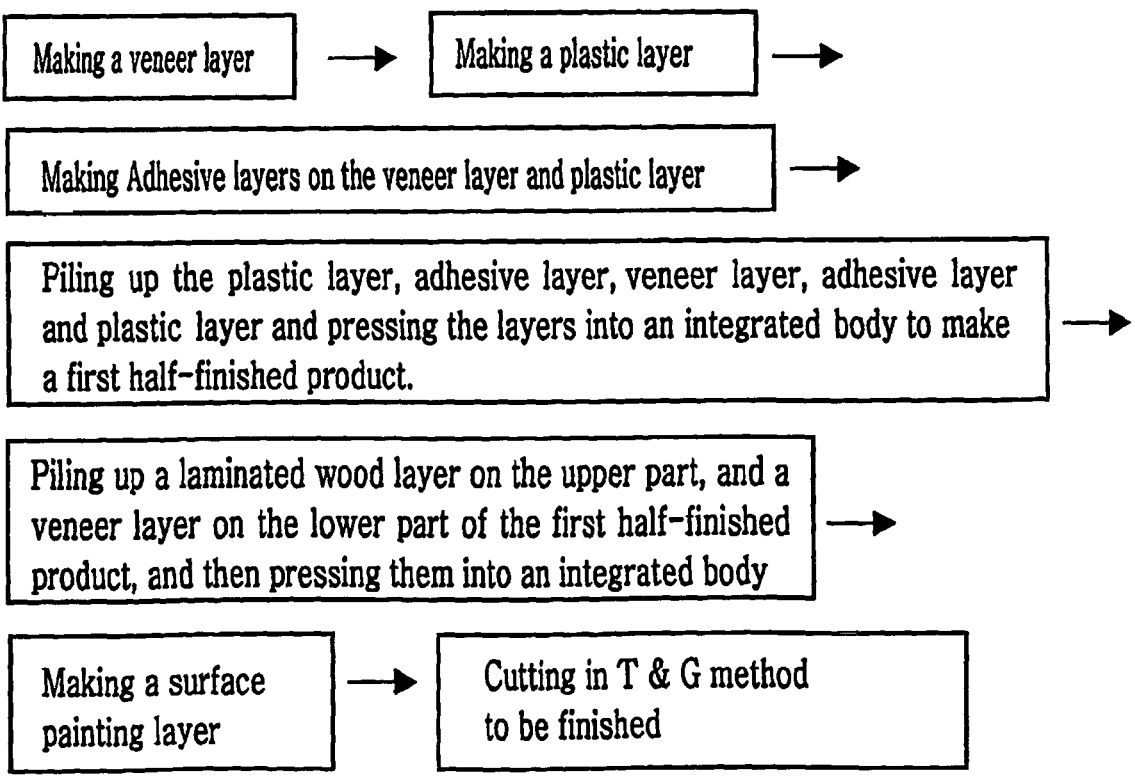

FIG. 6b is a scheme for illustrating the manufacturing process of a wood flooring with a symmetric structure according to the present invention, in which a veneer layer is piled between two plastic layers.

With reference to FIGS. 5 and 6b, each of a plastic layer (40), a veneer layer (50) and a plastic layer (40) are coated with an adhesive and then heat-pressed to produce a first half-finished product. The upper part and lower part plastic layers of the half-finished product are coated with epoxy adhesive in an amount of 70 to 150 g/m$^2$, respectively, to which the upper laminated layer (20) and another veneer layer (50) are piled, respectively. Subsequently, the resultant is cold-pressed under a pressure of 10±2 kg/cm$^2$ for 1 hour to make an integrated body, and then kept in a room at a temperature of 40 to 60° C. for 4 to 5 hours to harden the adhesive completely.

Alternatively, each of the laminated wood layer (20), the plastic layer (40), the veneer layer (50), the plastic layer (40) and the veneer layer (50) may be coated with adhesive layer and then heat-pressed simultaneously to make an integrated body, as shown in FIG. 6a.

Next, a surface painting layer (10) is made on the integrated body. The surface painting proceeds in the same manner of a conventional wood flooring. Firstly, the surface of the laminated wood layer (20) is sanded for easy infiltration of paints, on which a bottom, middle and top painting layers are made in turn and hardened.

The bottom painting layer is made to increase the adhesiveness between the laminated wood and paints, to fix and stabilize the wood fiber, and to enhance the compatibility with the paints to be coated in the next process. The bottom painting layer is coated to a thickness of 10 to 30 μm by using a roll coater once or twice, and then hardened by UV lamp. Urethane acrylate resin is preferably used for the paints.

The middle painting layer is made to plug the rough surface of laminated wood and to enhance the adhesiveness with the top painting layer to be coated thereon. For the middle painting layer, the urethane acrylate resin is coated to a thickness of 10 to 30 μm by using a roll coater, which is then hardened by UV lamp.

In order to make a smooth layer, the top painting layer is coated after the polishing of surface. For the top painting layer, the urethane acrylate resin is coated to a thickness of 10 to 20 μm by using a roll coater, which is then hardened by UV lamp.

Figure 7:
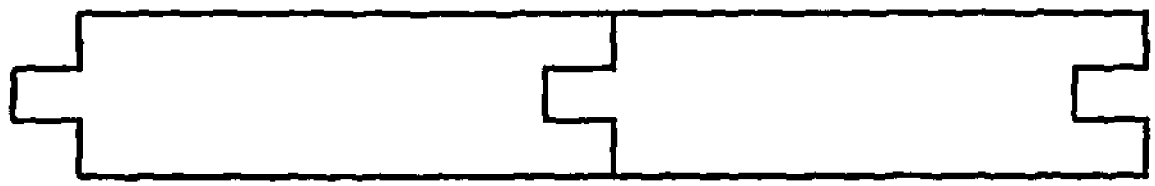
FIG. 7 is a schematic cross-sectional view of a wood flooring with a symmetric structure according to the present invention which is constructed by T & G cutting.

After the surface painting, as shown in FIG. 7, T & G (Tongue & Groove) cutting is carried out for solving the problems of irregularity on the ground and difference of height between the products which arise in cutting process.

Further to the surface layer of the wood flooring with laminated wood, the wood flooring may be manufactured by finishing it with HPL (high pressure laminate) or LPM (low pressure melamine) without surface painting.

The HPL is a finishing material and, in which paper is used as a base is material, includes a surface overlay layer, a printing layer and a core layer. Each layer is immersed with melamine resin or phenol resin and then pressed to a thickness of 0.4 to 0.7 mm, which is used in place of laminated wood to make an integrated body. The LPM is finished by piling up an immersed surface overlay layer and printing layer on a plastic layer, which is then simultaneously integrated and hardened, instead of separate piling up and hardening.

Hereinafter, the present invention will be described in detail, in conjunction with various examples. These examples are provided only for illustrative purposes, and the present invention is not to be construed as being limited to those examples.

EXAMPLE 1

A wood flooring having laminated wood and plastic layers symmetric to each other was manufactured by piling up, from the bottom, a veneer layer (50), an adhesive layer (30), a plastic layer (40), an adhesive layer (30) and a laminated wood layer (20), heat-pressing the layers into an integrated body, making a surface painting layer on the integrated body and cutting the integrated body in T & G method.

In the above steps, the laminated wood layer (20) had a thickness of about 0.55 mm (0.5 to 0.6 mm), and a water content of at most 12%. The veneer layer (50) had a thickness of about 0.70 mm (0.65 to 0.75 mm), and the plastic layer (40) had a thickness of about 5.0 mm. Therefore, total thickness was designed to be about 6.0 mm. The adhesive layers were used after being coated on a glass fiber (30 to 100 g/m$^2$) for reinforcing the dimension stability. As the adhesive having the compatibility with wood and plastic, epoxy or urethane were used. For the laminated wood layer (20), the seven trees mentioned above having a specific gravity of about 0.4 to 0.6 were used. On the other hand, the veneer layer (50) was made of keruing which has a specific gravity of 0.64 to 0.84 and a water content of 5 to 10%. The plastic layer (40), as a core layer of the wood flooring, comprised 100 parts by weight of PVC, 32 to 36 parts by weight of plasticizer, 530 to 600 parts by weight of calcium carbonate (filler), 10 parts by weight of heat-resisting stabilizer and 9 parts by weight of processing agent, in which calcium carbonate was 75 to 80% of the total weight.

In the manufacturing process, each layer was piled up appropriately and then pressed into an integrated body at a temperature of about 140° C. under a pressure of about 13 kg/cm$^2$ for 25 to 30 minutes of heating, and then 25 to 30 minutes of cooling. The surface of laminated wood layer was sanded and then a bottom and middle painting layers were made thereon. The product was cut to have a width of 75 to 92 mm and a length of 900 mm, using tenoner, and the side was processed by T & G form. Lastly, a top painting was made on the surface, and then the finished product was packaged.

EXAMPLE 2

The procedures of Example 1 were repeated except that the same laminated wood layer as used in the upper layer was used in the lower layer.

EXAMPLE 3

A wood flooring having laminated wood and plastic layers symmetric to each other was manufactured by piling up, from the bottom, a veneer layer (50), an adhesive layer (30), a plastic layer (40), an adhesive layer (30), a veneer layer (50), an adhesive layer (30), a plastic layer (40), an adhesive layer (30) and a laminated wood layer (20), heat-pressing the layers into an integrated body, making a surface painting layer on the integrated body and cutting the integrated body in T & G method. In this case, the middle veneer layer also accomplished the symmetric structure even without the lower veneer layer. The subsequent procedures of Example 1 were repeated to produce the wood flooring.

EXAMPLE 4

In the above Example 3, the plastic layer (40), the adhesive layer (30), the veneer layer (50), the adhesive layer (30) and the plastic layer (40), which consisted of a core layer, were separately heat-pressed under the condition of Example 1, and then the upper layer, e.g., the laminated layer (20) only or both the laminated layer (20) and the veneer layer (50) were piled up to produce an integrated body. At this time, the adhesive, which hardens after being coated at room temperature, such as epoxy or PU was coated on the upper part or both the upper and lower parts of the half-finished product, which was pressed under a pressure of 10 kg/cm$^2$ for one to two days to be an integrated body. The subsequent procedures of Examples 1 were repeated to produce the finished product.

EXAMPLE 5

The procedures of Example 3 were repeated except that calcium carbonate was added in an amount of 75% by weight of the plastic layer (40), and each of elvan, jade and loess was added in an amount of 10% of the total weight of the calcium carbonate to produce a wood flooring to increase the radiation of far infrared ray, thereby being good for the health.

EXAMPLE 6

The procedures of Example 5 were repeated except that the amount of the calcium carbonate was reduced to 150 to 200 parts by weight instead of 400 to 600 parts by weight in the plastic layer (40), and iron was added in an amount of 200 to 250 parts by weight to increase the soundproof effect.

Figure 2:
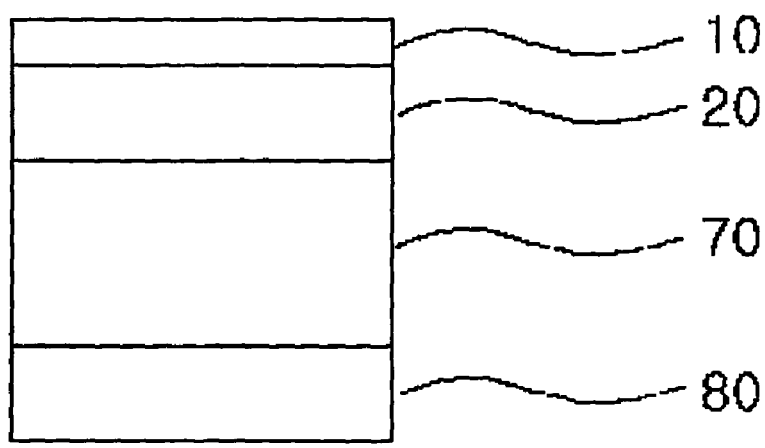
FIG. 2 is a schematic cross-sectional view of a natural wood flooring PVC tile which is disclosed in Korean Patent Laid-open Publication No. 1998-47176.
Figure 3:
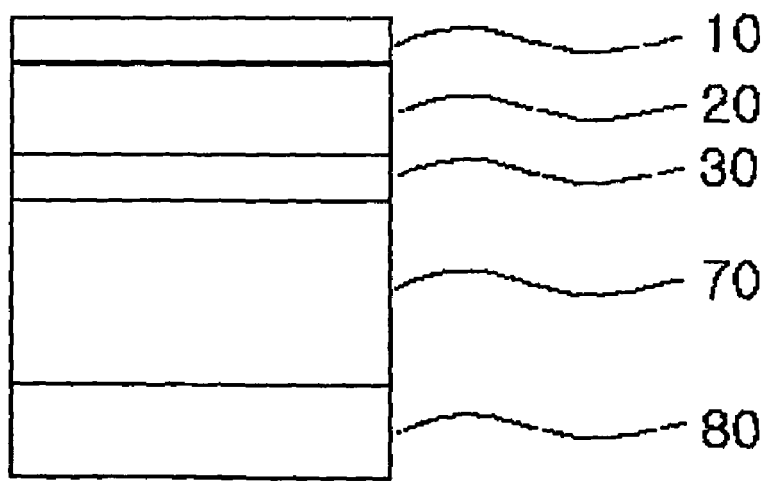
FIG. 3 is a schematic cross-sectional view of a wood flooring with laminated wood which is disclosed in Korean Patent Registration No. 292,585.

The physical properties of the wood floorings manufactured in the above Examples were compared with conventional wood floorings shown in FIG. 1 (Comparative Example 1), FIG. 2 (Comparative Example 2) and FIG. 3 (Comparative Example 3). The results are shown in Table 1.

TABLE 1

| | Dimension stability | Radiation of far IR ray | Heat preservation (Heat loss) | Soundproofing (Sound absorption) | Balancing effect |
|---|---|---|---|---|---|
| Example1 | Less than 0.20% | 90% | 3% | 58 dB | Less than 0.20 mm |
| Example2 | Less than 0.20% | 90% | 3% | 58 dB | Less than 0.15 mm |
| Example3 | Less than 0.25% | 90% | 2% | 57 dB | Less than 0.25 mm |
| Example4 | Less than 0.20% | 90% | 2% | 57 dB | Less than 0.20 mm |

TABLE 1-continued

|  | Dimension stability | Radiation of far IR ray | Heat preservation (Heat loss) | Soundproofing (Sound absorption) | Balancing effect |
|---|---|---|---|---|---|
| Example5 | Less than 0.25% | 91% | 2% | 57 dB | Less than 0.25 mm |
| Example6 | Less than 0.20% | 90% | 2% | 53 dB | Less than 0.20 mm |
| Comparative Example1 | Less than 0.25% | 88% | 25% | 60 dB | Less than 0.45 mm |
| Comparative Example2 | 0.35% | 89% | 18% | 62 dB | 0.50 mm |
| Comparative Example3 | Less than 0.20% | 90% | 3% | 58 dB | 0.35 mm |

In Table 1, the dimension stability was measured as the dimensional variation after being kept at a temperature of 80° C. for 6 hours. The radiation of far infrared ray was the result from the test of Korea Institute of Construction Materials. The test conditions were as follows: test temperature was 40 to 400° C., test wavelength was 3 to 20 μm, and test piece had the size of 40×40×4 mm or two circular test pieces had a diameter of 50 mm (common). Heat loss was measured by temperature rising and maintenance time according to heating on/off of the flooring. Soundproofing was measured by test of light crashing sound in which five steel hammers of 500 g arranged at 10 cm intervals were made free fallings sequently at 0.1 second interval and then the sounds was measured by Tapping machine. Balancing effect was measured by the extent of bend in the direction of width after being kept at room temperature and 80° C. for 6 hours.

INDUSTRIAL APPLICABILITY

A wood flooring having laminated wood and plastic layers symmetric to each other and method of manufacturing the same, according to the invention, provides natural feeling in surface and prevents from distortion according to the change of environment. Further, the wood flowing may promote health by adding elvan, jade or loess in the plastic layer thereof. Furthermore, the wood flowing may decrease the ground crashing sound by piling a separate soundproof sheet layer in the plastic layer or by using a soundproof sheet layer as the plastic layer. Thus, the wood flooring of the present invention has a superior heat transfer effect compared to wood so that, when used in the under-floor heating system, it solves the problem of distortion caused by heat and moisture, thereby being used in any environment.

The present invention also provides a wood flooring which has a PVC layer to reinforce the water-resistance and dimension stability as well as the effect of under-floor heating system, crashing absorption, soundproofing and radiation of far infrared ray. Especially, it provides a wood flooring which uses a symmetric structure to increase the balancing effect, and employs T & G method to solve the problem of height difference between the products caused by the irregularity on the ground, thereby being suitable to the Korean under-floor heating system.

What is claimed is:

1. A wood flooring, comprising:
    a lower layer including a first veneer layer and a first adhesive layer on the first veneer layer;
    a core layer including a first plastic layer on the first adhesive layer and a second adhesive layer on the first plastic layer; and
    an upper layer including a laminated wood layer on the second adhesive layer,
    wherein the upper layer and the lower layer are symmetric with respect to the core layer, and the first plastic layer comprises calcium carbonate in an amount of at least 70% by weight based on the total weight of the first plastic layer.

2. A wood flooring, comprising:
    a lower layer including a first veneer layer and a first adhesive layer on the first veneer layer;
    a core layer including a first plastic layer on the first adhesive layer, a second adhesive layer on the first plastic layer, a second veneer layer on the second adhesive layer, a third adhesive layer on the second veneer layer, a second plastic layer on the third adhesive layer, and a fourth adhesive layer on the second plastic layer; and
    an upper layer including a laminated wood layer on the second adhesive layer,
    wherein the upper layer and the lower layer are symmetric with respect to the core layer and the first or second plastic layer comprises calcium carbonate in an amount of at least 70% by weight based on the total weight of the first or second plastic layer.

3. The wood flooring of claim 1, wherein the veneer layer of the lower layer is made of the same material as the laminated wood layer of the upper layer to form a symmetric structure.

4. The wood flooring of claim 1, further comprising a surface painting layer pilled on the laminated wood layer of the upper layer.

5. The wood flooring of claim 1, wherein the laminated wood layer includes a laminated wood sliced from material wood, HPL (high pressure laminate) or LPM (low pressure melamine), the HPL and LPM having wood pattern.

6. The wood flooring of claim 1, wherein the first or second plastic layer comprises at least one selected from the group consisting of polyethylene (PE), polypropylene (PP), polyvinyl chloride (PVC), rubber and polyurethane (PU) as a base polymer.

7. The wood flooring of claim 1, wherein the first plastic layer further comprises at least one selected from the group consisting of elvan, jade and loess, in an amount of 10 to 20% by weight based on the total weight of the calcium carbonate.

8. The wood flooring of claim 1, wherein a soundproof layer is further contained, or wherein the first plastic layer further comprises iron in an amount of at least 100 parts by weight per 100 parts by weight of the base polymer, wherein the amount of the calcium carbonate is reduced to be 150 to 200 parts by weight per 100 parts by weight of the base polymer.

9. A method of manufacturing a wood flooring, comprising:
    making a lower layer including a first veneer layer and coating an adhesive on the first veneer layer;
    making a core layer including a first plastic layer and coating the adhesive on the first plastic layer;
    sequentially piling up the lower layer, the core layer, and an upper layer including a laminated wood layer coated with the adhesive to form a symmetric structure of the lower and upper layers with respect to the core layer, and pressing the piled layers into an integrated body; and
    making a surface painting layer on the laminated wood layer of the integrated body and cutting the integrated body on which the surface painting layer is made,
    wherein the lower layer and the upper layer are symmetric to each other with respect to the core layer, and the first plastic layer comprises calcium carbonate in an amount of at least 70% by weight based on the total weight of the first plastic layer.

10. A method of manufacturing a wood flooring, comprising:
making a lower layer including a first veneer layer and coating an adhesive on the first veneer layer;
making a core layer including a first plastic layer, a second veneer layer and a second plastic layer, and then coating the adhesive on the first plastic layer, the second veneer layer and the second plastic layer;
sequentially piling up the lower layer, the core layer, and an upper layer including a laminated wood layer coated with the adhesive to form a symmetric structure of the lower and upper layers with respect to the core layer, and pressing the piled layers into an integrated body; and
making a surface painting layer on the laminated wood layer of the integrated body and cutting the integrated body on which the surface painting layer is made,
wherein the lower layer and the upper layer are symmetric to each other with respect to the core layer, and the first or second plastic layer comprises calcium carbonate in an amount of at least 70% by weight based on the total weight of the first or second plastic layer.

11. The method of claim 10, wherein making a core layer comprises pressing and integrating the piled first plastic layer, second veneer layer and second plastic layer, and wherein the laminated wood layer of the upper layer and the first veneer layer of the lower layer are added to the integrated core layer.

12. The method of claim 9, wherein pressing the piled layers into an integrated body comprises pressing the piled layers under a constant pressure with continued heating and cooling.

13. The method of claim 12, wherein the pressing is carried out at a heating temperature of 110 to 150° C.

14. The method of claim 9, wherein the first veneer layer of the lower layer and the laminated wood layer of the upper layer are symmetric to each other.

15. The wood flooring of claim 2, wherein the veneer layer of the lower layer is made of the same material as the laminated wood layer of the upper layer to form a symmetric structure.

16. The wood flooring of claim 2, further comprising a surface painting layer pilled on the laminated wood layer of the upper layer.

17. The wood flooring of claim 2, wherein the laminated wood layer includes a laminated wood sliced from material wood, HPL (high pressure laminate) or LPM (low pressure melamine), the HPL and LPM having wood pattern.

18. The wood flooring of claim 2, wherein the first or second plastic layer comprises at least one selected from the group consisting of polyethylene (PE), polypropylene (PP), polyvinyl chloride (PVC), rubber and polyurethane (PU) as a base polymer.

19. The method of claim 10, wherein pressing the piled layers into an integrated body comprises pressing the piled layers under a constant pressure with continued heating and cooling.

20. The method of claim 10, wherein the first veneer layer of the lower layer and the laminated wood layer of the upper layer are symmetric to each other.

* * * * *

UNITED STATES PATENT AND TRADEMARK OFFICE
CERTIFICATE OF CORRECTION

PATENT NO. : 7,575,813 B2  Page 1 of 1
APPLICATION NO. : 10/509953
DATED : August 18, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Seventh Day of September, 2010

David J. Kappos
*Director of the United States Patent and Trademark Office*